(12) United States Patent
Mounir

(10) Patent No.: US 6,433,915 B2
(45) Date of Patent: Aug. 13, 2002

(54) PRECONDITIONING OF THE PASSENGER COMPARTMENT OF A VEHICLE WHILE STATIONARY

(75) Inventor: Ben Fredj Mounir, Tokyo (JP)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/739,300

(22) Filed: Dec. 19, 2000

(30) Foreign Application Priority Data

Dec. 20, 1999 (FR) .............................................. 99 16069

(51) Int. Cl.$^7$ ................................................ G02F 1/15
(52) U.S. Cl. ........................................................ 359/265
(58) Field of Search ................................ 359/241, 265, 359/267, 275; 428/699, 432, 702; 446/14; 106/21; 427/152, 146, 148, 149, 258, 270, 271, 276, 375, 402; 156/230, 240, 239, 252; 252/583; 345/106; 349/21, 161, 20, 184

(56) References Cited

U.S. PATENT DOCUMENTS

| 4,474,433 A | * 10/1984 | Nicholson et al. .......... 359/273 |
| 4,887,890 A | 12/1989 | Scherber et al. ............. 359/265 |
| 4,917,643 A | * 4/1990 | Hippely et al. ............... 446/14 |
| 5,774,255 A | 6/1998 | Howard ....................... 359/267 |
| 5,830,529 A | * 11/1998 | Ross ........................... 427/152 |
| 5,976,717 A | * 11/1999 | Holdik et al. ............... 428/699 |

FOREIGN PATENT DOCUMENTS

| DE | 4418490 | | 11/1995 |
| DE | 19819552 | | 11/1999 |
| DE | 296 22 745 U1 | * | 12/2000 |
| EP | 0357844 | | 3/1990 |
| EP | 0814132 | | 12/1997 |
| JP | 5-209874 | * | 8/1993 |
| JP | 6-80912 | * | 3/1994 |

\* cited by examiner

*Primary Examiner*—Jordon M. Schwartz
*Assistant Examiner*—William Choi
(74) *Attorney, Agent, or Firm*—Liniak, Berenato, Longacre & White

(57) ABSTRACT

A complex film containing at least one functional material making it possible to modify the optical properties of the film between a first, transparent state and a second, reflecting state is deposited on at least some of the interior fittings of the passenger compartment of a motor-vehicle, which makes it possible to isolate the fittings covered over with the film from solar radiation in hot weather. The change of state is controlled electrically. The film can preferably be put into a third, opaque state, which makes it possible to accentuate the heating-up of the fittings under the effect of solar radiation in cold weather.

10 Claims, No Drawings

PRECONDITIONING OF THE PASSENGER COMPARTMENT OF A VEHICLE WHILE STATIONARY

FIELD OF THE INVENTION

The present invention relates to a method for modifying the optical characteristics of visible parts of a vehicle that are situated inside or outside the passenger compartment, with the exception of the glazing.

BACKGROUND OF THE INVENTION

Cost imperatives impel motor-vehicle constructors to standardize the manufacturing operations, although the users want their vehicle to be customized, especially as regards the choice of the colors of the bodywork and of the interior fittings. The desire of the users might even be to be able to modify the color of the passenger compartment at will, according to the weather at the time, the color of their clothes or quite simply according to their mood.

The object of the invention is to satisfy these contradictory requirements.

SUMMARY OF THE INVENTION

The invention aims to achieve its objective by virtue of a complex film containing at least one material with an X-chromic function being deposited on the said visible parts.

The system may be purely passive. In this case, the functional material is a thermochromic material that changes its optical characteristics, especially its color, as a function of the ambient temperature.

The alterations to the optical characteristics may also be obtained via a deliberate action by the user. In this case, the functional material is of the magnetochromic or electrochromic type, capable of taking up at least two states as a function of the voltage applied to electrodes of the complex film. The absence of voltage corresponds to a first state and the presence of a voltage corresponds to a second state.

The method according to the invention may also be used to precondition the temperature in the passenger compartment of the vehicle when stopped.

DETAILED DESCRIPTION OF THE INVENTION

When a stationary vehicle is exposed to the sun in hot weather for a prolonged period, the temperature of the air in the passenger compartment becomes markedly higher than the outside temperature. This is due to the fact that the passenger compartment is subjected to solar radiation passing through the windscreen and the windows of the vehicle. Not only is the air of the passenger compartment heated up, but the fittings of the passenger compartment also store the heat energy.

Currently, the cooling systems mounted on motor vehicles are dimensioned to allow the removal of the heat energy stored in the passenger compartment in the course of a prolonged stationary period in full sun during hot weather. The main test for all the procedures for qualification of cooling systems corresponds to the measuring of the speed of descent of the temperature after the passenger compartment has been brought to temperature under the conditions described above. The energy expended to sustain a comfortable temperature in a vehicle is far less than that demanded in the start-up phase after a prolonged period stationary in full sun during hot weather. Moreover, if the air-conditioning system is sufficiently powerful to cause the temperature in the passenger compartment to fall rapidly, it is particularly disagreeable for the users to enter an overheated vehicle.

In order to remedy these defects, and, if appropriate, to make it possible to install an air-conditioning loop having smaller components, several solutions are already known.

One of these solutions consists in storing cold energy in a phase-changing salt or in a material with a high specific-heat coefficient. The quantity of cold energy stored is proportional to the weight of the system. This solution therefore generates additional weight and it does not have high availability, since it often requires slow regeneration of the cold energy after starting up.

Another solution consists in ventilating the passenger compartment when stationary in order to remove the bubble of air stored in the vehicle and to replace it by markedly colder outside air. It should be noted that, if the outside air is at 45° C., the temperature on the inside of the passenger compartment may reach 85° C. after one hour of exposure in full sun. However, the effect of this air renewal remains of second order, since the heating of the dashboard, of the seats and of the other fittings takes place by direct radiation of the solar light through the glazing of the vehicle, and the heat stored by these fittings will entail rapid reheating of the renewed air.

The best solution would lie in total protection of the glazing of the vehicle against solar radiation. Ventilation of the passenger compartment could, if appropriate, be combined with that.

However, the solutions that currently exist for isolating the passenger compartment are either mechanical or optical. The mechanical solutions, by means of blinds, for example, are difficult to implement. The optical solutions by means of electrochromic films or liquid-crystal films are elegant, but present a few drawbacks. Electrochromic films deposited on the glazing entail opaqueness of the glazing and lead to it being heated up. The glazing then radiates, at infrared, into the passenger compartment. The inclusion of a liquid-crystal film into the glazing or the application of a liquid-crystal film to the glazing, the crystals being able to take up a transparent state or a reflecting state under the effect of an electric field, present a risk to the extent that an electrical fault could entail serious accidents while the vehicle is being driven as a result of the loss of visibility through the glazing.

In order to allow preconditioning of the temperature in the passenger compartment of the vehicle, especially when stationary and especially in hot weather, the functional material chosen may take up a first, transparent state and a second, reflecting state which makes it possible to isolate the parts covered over by the said complex film from at least some of the incident radiation, especially the solar radiation.

Thus the advantages of the materials with a reversible reflecting effect, such as liquid-crystal films, are used without exposing the users of the vehicle to safety risks in the course of driving as a result of electrical breakdowns.

This complex film may cover over the outer walls that bound the passenger compartment, the outer faces of the doors and the top of the roof. The solar rays that strike these walls are reflected outwards. This prevents overheating of the walls. It should be noted that this function can be achieved while the vehicle is traveling in hot weather and allows a saving of cooling energy supplied by the cooling loop.

The complex film may also cover over some of the interior fittings of the passenger compartment, especially the dashboard, the fittings of the doors and of the roof, the door handles, and the steering wheel. The seats of the vehicle may also be covered over with the said film. This film may take the form of a thin skin or may coat the threads of the fabric of the seats or other fittings.

In the event that lamps exist within the vehicle, for example infrared lamps for deicing or demisting the windscreen, the film has to protect the fittings from the radiation from these lamps that may be turned accidentally partly towards them. However, the film does not necessarily filter all the radiation.

Advantageously, the change of state is controlled electrically, either manually by the driver from the driver's position, or automatically as a function of the temperature of the outside air and of the insolation.

The film is preferably in the reflecting state when the functional material is subjected to an electric field, and in the transparent state in the absence of electric field. In this case, the complex film includes electrodes in the form of electrically conducting thin films, which are capable of being supplied with an electric current. The electrical voltage is maintained by the action of a photovoltaic cell.

When the film covering over the interior fittings of the passenger compartment is set to the reflecting state, the solar rays which come to strike the film are reflected to the inside of the passenger compartment or the outside. This avoids overheating of the fitting equipped with the complex film.

The functional material advantageously includes liquid crystals. The latter are preferably chosen from among liquid crystals that make it possible to modify the optical properties of the film between a first, transparent state, a second, reflecting state and a third, opaque state, the choice between the reflecting state and the opaque state being a function of the strength of the electric field, the opaque state advantageously making it possible to accentuate the heating-up of the fittings under the effect of the solar radiation in cold weather.

According to another characteristic of the invention, the complex film includes several complementary functional materials the color of which is controlled electrically.

This characteristic makes it possible, at will, to change the colors of the fittings, as a function of the voltage applied to the electrodes. The choice of the voltage can be made automatically by an electronic system on the basis of the identification of the driver.

According to another characteristic of the invention, the passenger compartment is ventilated, in hot weather, when the difference between the temperature inside the passenger compartment and the outside temperature is greater than a predetermined value, so as to remove the bubble of hot air from the passenger compartment.

This function can be managed by the electronic system of the vehicle. After the renewal of the air of the passenger compartment, a longer time will be required to reheat the renewed air, due to the fact that the fittings are insulated from the solar radiation.

What is claimed is:

1. A method for modifying the optical characteristics of visible parts of a vehicle, which are situated inside or outside the passenger compartment, with the exception of the glazing, wherein a complex film containing at least one functional material with an X-chromic function is deposited on said parts, wherein the functional material is one of a magnetochromic ad electrochromic type and includes electrodes, wherein said functional material is capable of taking up at least two states as a function of the voltage applied to the electrodes.

2. A method according to claim 1, wherein the functional material may take up a first, transparent state and a second, reflecting state which makes it possible to isolate the visible parts covered over by the said complex film from at least some radiation that is incident on said parts, especially solar radiation.

3. A method according to claim 1, wherein at least some of the interior fittings of the passenger compartment, especially the dashboard, are covered over by said complex film.

4. A method according to claim 1, wherein the complex film includes electrodes and is in a reflecting state when the electrodes are subjected to an electrical voltage, and in a transparent state in the absence of voltage.

5. A method according to claim 4, wherein the electrical voltage is maintained by the action of a photovoltaic cell.

6. A method according to claim 4, wherein the functional material includes liquid crystals.

7. A method according to claim 6, wherein the liquid crystals make it possible to modify optical properties of said complex film between a first, transparent state, a second, reflecting state and a third, opaque state, the choice between the reflecting state and the opaque state being a function of the strength of the electric field, the opaque state making it possible to accentuate the heating-up of the fittings under the effect of solar radiation in cold weather.

8. A method according to claim 2, wherein the complex film includes several complementary functional materials the color of which is controlled electrically.

9. A method according to claim 2, wherein said method is used to precondition the temperature in the passenger compartment of the vehicle when stationary.

10. A method according to claim 9, wherein the passenger compartment is ventilated when the difference between the temperature inside the passenger compartment and the outside temperature is greater than a predetermined value, so as to remove hot air from the passenger compartment.

* * * * *